March 5, 1963 H. R. LAGATSKI 3,080,220
TREATMENT OF POTASH ORES
Filed July 13, 1959
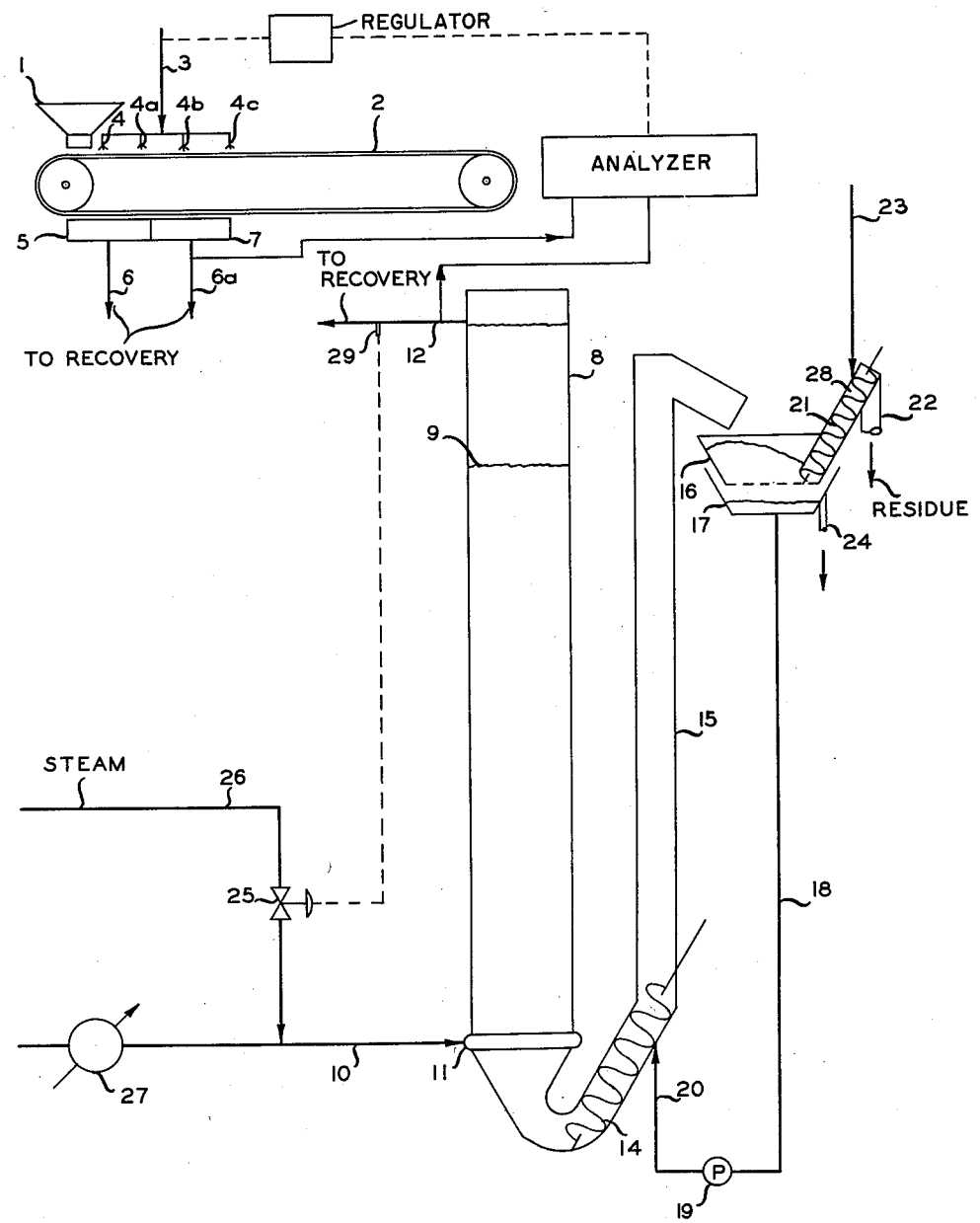
INVENTOR.
H. R. LEGATSKI
BY
Hudson + Young
ATTORNEYS

United States Patent Office 3,080,220
Patented Mar. 5, 1963

3,080,220
TREATMENT OF POTASH ORES
Harold R. Legatski, Bartlesville, Okla., assignor to Phillips Petroleum Company, a corporation of Delaware
Filed July 13, 1959, Ser. No. 826,636
5 Claims. (Cl. 23—312)

This invention relates to the treatment of potash ores to recover potassium salt therefrom. In one of its aspects, the invention relates to a two-step process in which, in the first step, the ore is washed to remove therefrom magnesium salts and sulfate salts and in which, in the second step, the washed ore is extracted or leached to recover potassium chloride therefrom. In another aspect of the invention, crushed ore, such as sylvite, is washed, for example, on a moving belt, with water or in a preferred form, with saturated brine, to remove essentially magnesium salts and sulfate salts and then the thus-treated ore is leached with brine to obtain a liquor from which potassium chloride can be recovered in a crystallization operation not hindered by said salts. In a further aspect of the invention, it relates to a modus operandi in which the washed ore is leached with the brine in a countercurrent operation in which the brine flows upwardly through a vessel while the crushed, washed, wet ore passes downwardly through the vessel, is removed therefrom at the bottom and raised with the aid of a wash solution, from an ensuing filtering operation, into a filter wherein last said operation is effected. In a further aspect of the invention, it provides a control of the amount or extent of washing of the ore in the first step by correlating the extent of said wash with the amount of magnesium and sulfate salts crystallizing in the potassium chloride product.

In the refining of crushed potash ore, clays may be present which make it difficult to filter the residue after the potassium chloride has been dissolved.

It is an object of the invention to provide a modus operandi for recovering potassium chloride from an ore containing the same. It is another object of the invention to provide for the removal of magnesium salts and sulfate salts from such an ore in such a manner that these salts are not present during crystallization to an extent sufficient to hinder desirable crystallization. A further object of the invention is to provide a method of handling and treating a potash ore in an economical manner in a combination of steps permitting the handling of a low grade ore to obtain a brine containing potassium chloride sufficiently concentrated to pass to crystallization. Another object of the invention is to provide for handling and moving of leached ore in an economical manner. A further object of the invention is to provide an improved method for the recovery of magnesium salts and sulfate salts from potash ores.

Other aspects, objects, and the several advantages of the invention are apparent from a study of this disclosure, the drawing, and the appended claims.

According to the present invention there is provided a method of treating a potash ore which comprises washing said ore in a first step to remove therefrom magnesium salts and sulfate salts. Further, according to the invention, the thus washed ore is leached of up to about 97 percent of its potassium chloride content in a second step by contacting the washed ore with hot brine, say, as obtained from crystallization tanks in which the used brine solutions of the invention are crystallized to remove water and sodium chloride therefrom, thus concentrating potassium chloride therein.

According to the invention the first step, in one embodiment, is effected on a moving, perforated belt which carries the ore from a crushing operation to a leaching tank and the amount of washing solution used to wash the ore on the belt is determined and adjusted by analyzing the washings at a point along the belt removed from the place of adding the washing solution thereto. Thus, the drippings from the belt are found less and less rich in magnesium and sulfate salts as the ore progresses toward the leaching tank.

Still according to the invention, leached ore from the second step is, at least in part, conveyed to a filtering step by using filtrate and washings from an ensuing filtering operation to lift the leached ore to said filtering operation by pumping said filtrate and washings into a transfer pipe to which the crushed leached ore is fed by mechanical means such as an auger, or other suitable means.

A study of this disclosure will show that the invention provides an economical, simply constructed apparatus for the recovery of potash values and the recovery of magnesium and sulfate salts from potash ores in a continuous manner.

Referring now to the drawing, the ground ore is passed from hopper 1 onto belt 2. Liquor, which is saturated with sodium chloride, is added to the crushed ore on belt 2 through line 3 and spray 4. A multiplicity of sprays as at 4a, 4b, and 4c can be used to provide fresh wash solution or liquor to already washed ore. The liquor percolates through the ore and dissolves substantially all of the magnesium and sulfate salts which can be dissolved in the liquor. A part of this liquor passes through the porous belt and is collected in a pan 5 and passed through line 6 for recovery of potassium chloride. If desired, pan 5 can be partitioned to provide for recovery of a solution relatively rich in magnesium and sulfate salts at 6 and a solution relatively less rich in said salts at 6a. Thus, the first liquid to drop into pan 5 will be that which contains the highest concentration of sulfates and magnesium compounds. As the liquor continues to drip from belt 2 into pan 5 toward the end 7 of pan 5, it becomes less concentrated in magnesium and sulfate compounds.

The liquor added through line 3 to the ore will also have a tendency to soak into the ore, so that the potassium chloride will be more rapidly leached from the ore later. The ore passes from the belt 2 into leach tank 8. The level 9 of ore in leach tank 8 is maintained. Near the bottom of leach tank 8, there is fed through line 10, into header 11 which surrounds leach tank 8, hot brine from the crystallization tanks wherein potassium chloride is crystallized. The hot brine at a temperature of 150° to 250° F. flows from header 11 into leach tank 8 to come into direct contact with the ore. This liquor passes through the ore, leaching potassium chloride from it and passes to the top of the leach tank 8 from where it is removed through line 12. Leached ore is removed from the bottom of leach tank 8 by means of an auger 14. The ore passes up through leg 15 and into filter 16. Filtered liquor from filter 16 collects in pan 17, is recycled through line 18 by means of pump 19, passed through line 20 and used to hydraulically lift the ore through leg 15. The residue from filter 15 is removed through conduit 20 by auger 21 and discarded through line 22. Any make-up water added to the system is added through line 23 for washing the residue as it passes through line 20. Any excess liquid that builds up in pan 17 overflows and passes through line 24 from where it may be added to the brine used for leaching potassium chloride from the ore.

The liquor, which overflows through line 12, and which is saturated with potassium chloride is passed to a crystallization process wherein the potassium chloride is recovered as crystals. The amount of magnesium and sulfate salts crystallizing in the potassium chloride product can be utilized to determine the quantity of liquor required to be passed through line 3 and be sprayed on the ore which is passing on belt 2. The change in concentration of the liquor dripping into pan 5 nearest to end 7 can also be used to determine whether enough liquor is being passed through line 3. This last concentration of magnesium and sulfate salts can be correlated with the concentration of said salts in the finished product.

As will be appreciated, the invention can treat pieces of ore ranging from one-half to two inches to recover therefrom about 95–97 percent of the contained potassium chloride. Also, about 60–70 percent of the brine used for leaching is sufficiently concentrated that it can be passed directly to the crystallizers. Moreover, the remainder of the leaching brine can be reused to leach unleached ore.

The first 5–10 percent of brine passing through the crushed ore contains substantially the soluble magnesium and sulfate salts.

In an apparatus about two feet in diameter and seventeen feet high, with crushed ore, as described above, leaching could be effected in about 1–2 hours to obtain the results described above.

The filter at 16 usually will have an about 8 mesh screen and there will be some clay in the water circulated from the residue at 16.

There is provided on the vessel 8 an arrangement essentially consisting of temperature-sensing element 29, valve 25 and steam inlet 26 to add steam to the hot brine to maintain a desired temperature in the brine effluent in 12. A heater 27 can, of course, carry the main heating duty.

*Example*

Twenty-five tons per hour of the sylvite ore are fed through hopper 1 and into the apparatus. The ore contains about 25 percent potassium chloride and about 96 percent of this potassium chloride is leached from the ore. About 10 percent of the total brine is fed through line 3 and 90 percent through line 11. The hot brine fed through line 10 is heated in heat exchanger 27 and then further heated by steam added into line 10 from line 26. The rate of addition of steam from line 26 into line 10 is controlled to maintain the temperature of the brine effluent in line 12 about 100° C. The brine passing through heat exchanger 27 in line 10 is heated to a temperature such that the live steam added to line 10 makes up the loss of heat in the brine in the refining process. The effluent brine from line 12 is cooled in the recovery of potassium chloride to a temperature of 27° C. In its passage through vessel 8, the concentration increases from 16 grams to 39 grams of KCl per 100 ccs. water.

The leaching chamber 8 in this example is about 7 feet in diameter and 40 feet from line 10 to the ore level 9 and about 10 feet from the ore level 9 to the effluent discharge line 12. The dry ore weighs about 125 pounds per cubic foot. Steam at 100 p.s.i.g. is added to line 10.

For some ores, it might not be necessary to use belt 2, hopper 1 and sprays 4. That is, some or all of the ore could be passed directly into leaching vessel 8.

Reasonable variation and modification are possible within the scope of the foregoing disclosure, drawing and the appended claims to the invention, the essence of which is that there have been provided a method for the recovery of potassium chloride from potash ores comprising washing a crushed potash ore upon a moving perforated belt and then leaching the washed potash ore with a brine solution, as in a countercurrent operation, as described herein, as with a brine solution, prior to leaching potassium chloride from said ore, and method and apparatus for the economical, simplified handling of such an ore; and a method for recovery of magnesium salts and sulfate salts from an ore containing the same while washing said ore with a washing solution or liquor such as a brine solution, said method and apparatus including the control of the washing of the crushed ore responsive to magnesium salts and sulfate salts present in the final potassium chloride product obtained.

I claim:
1. A method comprising the steps in combination as follows: grinding a potash ore, distributing the ground ore on a perforated moving belt, washing the ground ore on said moving belt to remove magnesium salt and sulfate salts therefrom, discharging washed ground ore from said belt to a leaching tank, maintaining a downwardly moving bed of washed ore in said leaching tank, passing hot brine upwardly through said bed of washed ore to leach potassium chloride therefrom, removing supernatant hot brine containing potassium chloride from said leaching tank, passing said removed brine to recovery of potassium chloride therefrom, removing leached ore from the bottom of said leaching tank, admixing leached ore with filtrate from an ensuing filtering operation, and conveying the admixture to a filtering operation as said ensuing filtering operation, in said filtering operation filtering leached ore, washing leached ore and recovering filtrate and washings and filtrate as separate streams.

2. An apparatus for the recovery of potassium chloride from ground potash ore, such as sylvite, which comprises, in combination, means for distributing ground potash ore upon a washing means, means for moving said washing means, means for spraying washing solution onto the ore on said moving washing means, leaching means for leaching washed ore, said washing means being located above and discharging washed ore into said leaching means, means for introducing leaching solution into said leaching means and for removing used leaching solution from said leaching means, means for conveying leached ore from the bottom of said leaching means to an ensuing filtering means, means for conveying filtrate from said ensuing filtering means to said means for conveying leached ore from the bottom of said leaching means, and means for conducting admixture of leached ore and filtrate, thus obtained, to said filtering means, and means for recovering as separate streams, filtrate and filtered leached ore from said filtering means.

3. An apparatus according to claim 2 wherein said washing means are provided with a plurality of washing sprays and a corresponding washings collection means, said washings collection means being subdivided to permit recovery of washings from the crushed ore as it moves in said washing means.

4. In a method which comprises recovering potassium chloride from a potash ore containing magnesium salts and sulfate salts and wherein said ore is treated to remove therefrom a substantial quantity of magnesium salts and sulfate salts and then leached to recover potassium chloride, the improvement which comprises the manipulative steps of crushing the potash ore; placing said ore upon a moving perforated belt; washing said ore while on said moving perforated belt with a washing solution in an amount sufficient to substantially remove an appreciable amount of magnesium salts and sulfate salts; draining said washing solution from the thus-washed ore while the thus-washed ore is moving on said perforated belt; recovering the washings from the operation; and then passing the thus-washed ore to a leaching operation for removal of potassium chloride therefrom, in said leaching operation, recovering potassium chloride product containing some residual magnesium salts and sulfate salts therein, determining the concentration of said residual magnesium salts and sulfate salts in said potassium chloride product and controlling the amount of washing of the crushed ore on said moving perforated belt responsive to said determined concentration to maintain said concentration at a determined desired value.

5. An apparatus for the recovery of potassium chloride from ground potash ore, such as sylvite, which comprises, in combination, means for distributing ground potash ore upon a moving washing means, means for moving said washing means, means for spraying washing solution onto the ore on said moving washing means, leaching means for leaching washed ore, said washing means being located above and discharging washed ore into said leaching means, means for introducing leaching solution into said leaching means and for removing used leaching solution from said leaching means, means for conveying leached ore from the bottom of said leaching means to an ensuing filtering means, means for conveying filtrate from said ensuing filtering means to said means for conveying leached ore from the bottom of said leaching means, and means for conducting admixture of leached ore and filtrate, thus obtained, to said filtering means, means for recovering as separate streams, filtrate and filtered leached ore from said filtering means, means for collecting washing fluid from said moving washing means, means for crystallizing potassium chloride from used leaching solution and means to determine the concentration of the magnesium salts and sulfate salts in the potassium chloride product and wherein means are provided to control the rate of washing responsive to the concentration of magnesium salts and sulfate salts in the potassium chloride product.

References Cited in the file of this patent

UNITED STATES PATENTS

| | | |
|---|---|---|
| 2,211,397 | Weinig | Aug. 13, 1940 |
| 2,231,154 | Chesney | Feb. 11, 1941 |
| 2,614,574 | Farrell | Oct. 21, 1952 |
| 2,699,379 | Luque | Jan. 11, 1955 |
| 2,968,525 | Clark et al. | Jan. 17, 1961 |